Patented Dec. 26, 1939

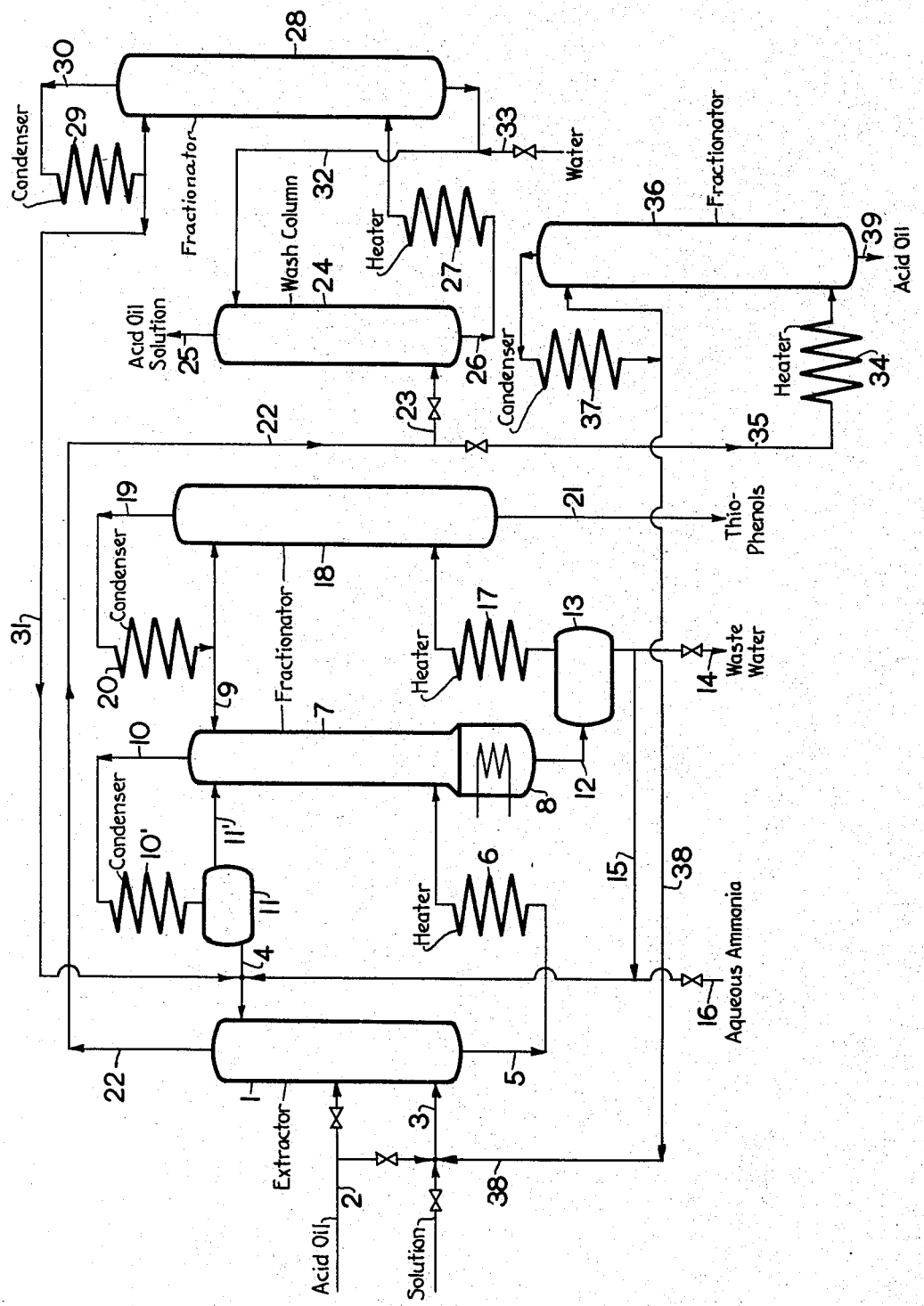

2,184,928

UNITED STATES PATENT OFFICE 2,184,928

PROCESS FOR THE SEPARATION OF THIO-PHENOLS FROM ALKYL PHENOLS

Daniel B. Luten, Jr., and Samuel Benson Thomas, Berkeley, Calif., assignors to Shell Development Company, San Francisco, Calif., a corporation of Delaware Application April 15, 1939, Serial No. 268,050

10 Claims. (Cl. 260—609)

This invention relates to a method for separating thiophenols from alkyl phenol mixtures containing same, by extraction with weak inorganic bases, and more particularly is concerned with the use of aqueous ammonia for this purpose.

The term "alkyl phenols" as herein used refers to mixtures of alkyl phenols which may contain varying amounts of phenol (hydroxy benzene), thiophenols and other impurities. These mixtures sometimes known as acid oils, are obtained by extracting cracked mineral oil distillates or coal tar distillates with strong aqueous solutions of alkali metal hydroxides and springing the resulting extracts with suitable acids. The thiophenols which they contain comprise benzene hydrosulfide and various alkyl thiophenols.

It has already been proposed to separate thiophenols from alkyl phenols by extracting the mixture with an organic water-insoluble solvent for alkyl phenols and an aqueous solution of an alkali metal hydroxide in an amount approximately equivalent to the thiophenol content of the acid oil. Now we have discovered that the separation can be carried out more effectively if in the extraction aqueous solutions of certain relatively weak bases, notably ammonia, are used instead of alkali metal hydroxides.

It is a purpose of this invention to separate thiophenols and alkyl phenols from acid oils effectively and inexpensively. It is another purpose to recover both alkyl phenols and thiophenols in substantially pure form, i. e., substantially free of each other; and it is a further purpose to carry out this separation at substantially no consumption of chemicals.

It is known that weak bases such as aqueous ammonia are substantially incapable of extracting alkyl phenols from their solutions in water-insoluble solvents such as naphtha, benzene, etc., because the distribution constants K for alkyl phenols between aqueous solutions of weak bases and the organic solvents are extremely low. Now we have discovered that contrary to expectations thiophenols can be extracted from their solutions in organic solvents rather efficiently with aqueous solutions of certain weak inorganic bases, in particular ammonia. Other bases effective when used as aqueous solutions are tripotassium phosphate, sodium borate, sodium arsenite, etc., having fairly high distribution constants K for thiophenols.

It is known that in general the distribution constants K for weak organic acids increase with increasing concentration and alkalinity of the aqueous solution up to the point where the salting out effect of the base overbalances further increases in the alkalinity upon concentrating the base. Therefore there is an optimum concentration at which the K value is highest, this optimum varying with the base and to some extent with the nature of both the phenols and the thiophenols. For tripotassium phosphate the optimum concentration is generally around 25%.

Ammonia, however, is an exception to this rule. As far as we have been able to determine, its extraction efficiency for thiophenols continues to rise steadily with an increase in concentration, and there seems to be no salting out effect. Ammonia is anomalous in another respect in that the rate of increase of the K value with increasing concentration of the ammonia is greater than that for other weak bases; and a further anomaly characteristic of ammonia, is that the K values are not the same for different concentrations of the thiophenols in the two phase system aqueous ammonia-organic solvent, but increase with decreasing concentration of the thiophenols. This last property makes ammonia an ideal extractant for countercurrent extraction since it greatly facilitates the removal of last traces of thiophenols from its organic solvent, a task which normally is very difficult to achieve.

Our process thus comprises countercurrently extracting alkyl phenols containing thiophenols, if desired in the presence of suitable water-insoluble solvents for alkyl phenols, with an aqueous solution of a relatively weak inorganic base having a concentration which results in as high a K value for thiophenols as is practically possible for the particular base. Aqueous ammonia of the highest concentration which can be handled without difficulties is preferred. The aqueous extract is then steamed or distilled to separate base and thiophenols from each other, and the base may be returned for extracting further amounts of acid oil.

When carrying out the extraction of the acid oil in the presence of certain solvents, and particularly when using ammonia as the base, frequently three separate phases are obtained: an alkyl phenol phase containing considerable amounts of water and base; a solvent phase containing some alkyl phenols and traces of water and base; and an aqueous phase containing the bulk of the base and a small amount of alkyl phenols. It is undesirable to carry out the extraction under conditions to form three phases, and the proportions of alkyl phenols, solvent and base should be chosen so that only two phases are obtained. Aliphatic hydrocarbon solvents in particular are likely to yield three phase systems, and frequently it is possible to reduce them to two phases by the addition of aromatic solvents, for instance benzene, toluene, xylene, pyridine, or aliphatic ethers such as isopropyl ether, or ketones as methyl ethyl ketone, etc. Aside from hydrocarbons, many other solvents, some of which are better than hydrocarbons for our purpose, may be used, provided they are neutral, substantially insoluble in water, chemically inert under the conditions of the extraction and possessing convenient boiling ranges. Thus we may use chlorinated hydrocarbons, such as carbon tetrachloride, chlorethane, chlorpropane, etc. Further, we have found that aliphatic ethers and aliphatic and hydroaromatic ketones of 4 to 10 carbon atoms per molecule are particularly useful as they have a strong preferential solvent power for alkyl phenols as against thiophenols. Among the preferred solvents we list the following: diethyl ether, diisopropyl ether, methyl propyl ethers, ethyl propyl ethers, dibutyl ethers, methyl butyl ethers, ethyl butyl ethers, propyl butyl ethers, diamyl ethers, chlorinated ethers as $\beta\beta$ dichlor ethyl ether, methyl ethyl ketone, methyl propyl ketone, methyl isopropyl ketone, methyl butyl ketones, ethyl propyl ketones, hexanone, cyclahexanol, etc.

Occasionally the presence of certain solvents such as diisopropyl ether may lead to the formation of emulsions which settle but slowly. Such emulsions, we have found, are due to electrical phenomena and are resolved quickly and effectively by exposing them to a high frequency electrical field. The presence of non-aromatic and in particular aliphatic solvents is desirable because the distribution constants for thiophenols between them and the aqueous phase are far higher than between aromatic solvents for thiophenols, such as the alkyl phenols themselves and the aqueous phase. The larger the amount of the aliphatic solvent the more favorable are the distribution constants. Therefore one may extract the thiophenols from cracked distillates not previously sulfuric acid treated and preferably boiling between about 150° and 300° C. without previously isolating the acid oils. Such distillates are substantially free from naphthenic acids and hence the thiophenol fractions so obtained are not contaminated therewith to any great extent. However, this method is cumbersome because of the necessity of having to treat very large amounts of the organic liquid with relatively small amounts of aqueous solution of ammonia in consequence of which the losses of ammonia may be very appreciable. For these reasons we usually prefer to employ a volume of solvent not more than about ten times the volume of the acid oil. Even much smaller volumes of solvent, such as a volume about equal to that of the acid oil, usually facilitate the separation of thiophenols from alkyl phenols with the aid of ammonia to such an extent that substantially pure alkyl phenol and thiophenol fractions can be obtained with ease. However, a volume of solvent less than about 20% of the acid oil is usually insufficient to result in a material benefit.

When using ammonia as the base, we prefer to employ aqueous solutions of not less than about 10% concentration, and preferably stronger than 20% concentration, the rate of increase of the distribution constants for thiophenols between the aqueous and alkyl phenol phases being approximately proportional to at least the 1.5 power of the ammonia concentration. Since, as previously pointed out, the distribution constant rapidly diminishes with increasing concentration of the thiophenols in the phases and in particular in the aqueous phase, it is desirable and necessary to employ amounts of base substantially in excess of and preferably many times the equivalent of the thiophenols to be extracted. Too large an excess of ammonia, however, has the disadvantage of requiring excessive amounts of steam for regeneration of the ammonia from the aqueous extract solution, and the proper choice of the amount of ammonia used is a matter of economical considerations. Normally it is useful to employ amounts of ammonia about 5 to 200 times and preferably 10 to 100 times the equivalent of the thiophenols to be removed.

Because of the effect of concentration of thiophenols on the distribution constant, it is furthermore highly desirable to carry out the extraction by countercurrent methods. Continuous countercurrent as well as so-called batch countercurrent methods are suitable. In the former method, both liquids, i. e., the acid oil or its solution and the aqueous ammonia flow in opposite directions through a tower or a series of mixers and settlers, while in the latter method the acid oil or its solution is merely contacted with a series of successively fresher batches of ammonia, the several batches remaining in their respective tanks.

Normal atmospheric temperatures are suitable in the extraction, although lower temperatures above those which give rise to a solid phase, and higher temperatures below the boiling temperature of the lowest boiling phase, may be used if desired.

The invention will be more fully understood by referring to the attached drawing which represents an illustrative flow diagram of our process.

Acid oil from an outside source not shown, containing thiophenols is introduced into countercurrent extractor 1. The acid oil may be free from solvents, or contain but small amounts thereof, in which case it may advantageously be admitted to an intermediate point of the extractor through line 2. Solvent may be introduced into the bottom of the extractor through line 3 from an outside source not shown, or from within the system as will be explained later. Or the acid oil may already be dissolved in substantial amounts of one or several suitable solvents in which case it may be preferable to admit it to the bottom of the extractor through line 3 and not to add further amounts of solvent.

Aqueous ammonia is flowed from line 4 downwardly through the extractor 1 in countercurrent to the ascending mixture of acid oil and solvent to strip same of thiophenols. Spent aqueous ammonia containing thiophenols and possibly a small amount of hydroxy benzene, if the acid oil originally contained substantial amounts of the latter, is stripped from alkyl phenols in the lower portion of the extractor by ascending solvent and is withdrawn from the extractor through bottom line 5 and flows through heater 6 to fractionator 7 which is equipped with reboiler 8. The aqueous ammonia is flashed off in the fractionator 7, and thiophenols which have a tendency to go overhead together with the ammonia and water vapors are washed back by means of a solvent for thiophenols introduced into the top of fractionator 7 through line 9, which solvent is neutral, substantially inert towards ammonia at the temperatures of the fractionation, preferably immiscible with water, and preferably boiling below the thiophenols and above about 50° C. to enable its separation from the ammonia. Solvents suitable for this purpose are for instance iso-octane, benzene, toluene, xylene, diisopropyl ether, dibutyl ether, methyl ethyl ketone, etc. If desired, the same solvent may be used as that employed in the extractor 1. Ammonia and water vapors usually containing solvent vapors are withdrawn from the fractionator 7 through vapor line 10, and are condensed in condenser 10'. The condensate is separated in tank 11, aqueous ammonia being admitted to the top of extractor 1 through line 4, and solvent returning to the top of fractionator 7 through line 11'.

Liquid solvent containing dissolved thiophenols and water emerge from fractionator 7 through bottom line 12 and go to settler 13 where they are separated, water being withdrawn through bottom line 14 and discarded, or if necessary returned through line 15 to the top of extractor 1. Make-up ammonia may be introduced into the system through line 16.

Thiophenol solution substantially free from water now flows through heater 17 to fractionator 18 where thiophenols and solvent are separated from each other by fractional distillation, solvent vapors passing out through vapor line 19, returning to the top of fractionator 7 through condenser 20 and line 9. Thiophenols, normally of high degree of purity, are withdrawn through bottom line 21.

Acid oil or its solution scrubbed by the aqueous ammonia and free from thiophenols but containing appreciable amounts of ammonia leaves extractor 1 through top line 22 to be processed in one of two ways as follows. It may go through line 23 to washer 24 where it is washed with water to remove dissolved ammonia. Washed acid oil substantially free from ammonia leaves the washer through line 25, while the wash water containing ammonia emerges through bottom line 26 and passes through heater 27 to fractionator 28, where it is flashed off to produce vapors rich in ammonia which are condensed in condenser 29 situated in line 30, condensate being returned through line 31 to the top of extractor 1; and a bottom stream consisting essentially of water which is returned to the top of the washer 24 through line 32. Fresh water for washing is introduced into the washing circuit through line 33.

The other alternative method for treating the extracted acid oil containing ammonia is often preferred and is applicable particularly in case the stripped acid oil in line 22 is in solution of a suitable solvent boiling below the acid oil. The solution is passed through heater 34 in line 35 to fractionater 36, where solvent containing ammonia is flashed off. The resulting vapors are condensed in condenser 37 and condensate returned to the bottom of extractor 1 through lines 38 and 3, while acid oil substantially free from solvent and ammonia is released through bottom line 39.

It is understood that the use of pumps, heat exchangers, coolers, by-passes, etc., not shown in the described flow diagram is within the skill of the average designer for petroleum refining equipment.

The following examples further illustrate our process:

*Example I*

Acid oil containing 11.8% thiophenols (2.96% hydrosulfide sulfur) was continuously extracted in a 20' column with aqueous ammonia and a solvent consisting of 65% iso-octane and 35% benzol. 0.36 gallon acid oil per hour was introduced into the column at a point 5 feet above its bottom. 0.49 gallon per hour of a 28% aqueous ammonia solution was admitted to the top of the column and 0.81 gallon per hour of the solvent was introduced at its bottom. The ammonia amounted to 22 times the equivalent of the thiophenols.

Two streams were taken from the column, a top raffinate consisting essentially of solvent and alkyl phenols and containing a small amount of ammonia; and a bottom extract comprising aqueous ammonia and thiophenols. The streams were distilled to remove solvent, ammonia and water. An alkyl phenol raffinate fraction amounting to 87% and a thiophenol extract fraction amounting to 13% of the acid oil were thereby obtained.

The raffinate fraction was further distilled under vacuum to yield a 95% overhead fraction having a hydrosulfide sulfur content of .007%. The extract fraction contained 18.8% hydrosulfide sulfur and consisted of more than 70% thiophenols.

*Example II*

The acid oil of Example I was continuously extracted in the apparatus and substantially under the conditions of Example I with the exception that a larger amount of ammonia was used. The ammonia amounted to 38 times the equivalent of the thiophenols.

After separating the raffinate and the extract streams from the column and distilling same to remove solvent, ammonia and water, a raffinate fraction amounting to 84% and an extract fraction amounting to 16% of the acid oil were recovered. The raffinate fraction was redistilled to produce a 94% overhead which had a hydrosulfide sulfur content of .003%. The extract fraction had a hydrosulfide sulfur content of 18.5% and consisted of about 70% thiophenols.

When air was allowed to come in contact with the acid oil, a portion of the thiophenols was converted to neutral disulfides which remained in the raffinate, but could be separated from the alkyl phenols by careful distillation under vacuum, disulfides remaining in the still residue. Similarly, when extract was exposed to air a portion of the thiophenols was converted to disulfides, particularly if the exposure took place prior to the removal of the ammonia. Therefore, if it is desired to recover the thiophenols, air should be excluded from the extraction system.

We claim as our invention:

1. In the process of separating thiophenols from an alkyl phenol mixture containing same, the steps comprising extracting said mixture in countercurrent with aqueous ammonia having a concentration not less than about 10% in an amount substantially in excess of that which is equivalent to the content of thiophenols in said mixture, under conditions to produce two layers only, an alkyl phenol layer and a layer of aqueous ammonia containing thiophenols, and separating the layers.

2. The process of claim 1 in which the amount of aqueous ammonia is from 10 to 100 times the equivalent of the thiophenol content in the alkyl phenol mixture.

3. In the process of separating thiophenols from an alkyl phenol mixture containing same, the steps comprising extracting said mixture with aqueous ammonia having a concentration not less than about 10% in an amount substantially in excess of that which is equivalent to the content of thiophenols in said mixture, under conditions to produce two layers only, an alkyl phenol layer and a layer of aqueous ammonia containing thiophenols, and separating the layers.

4. In the process of separating thiophenols from an alkyl phenol mixture containing same, the steps comprising extracting said mixture in the presence of an amount of not more than about 10 times the volume of said mixture of an organic solvent which is neutral, substantially chemically inert towards ammonia and substantially immiscible with water under the conditions of the extraction, with aqueous ammonia having a concentration not less than about 10% in an amount substantially in excess of that which is equivalent to the content of thiophenols in said mixture, under conditions to produce two layers only, an alkyl phenol layer containing solvent and a layer of aqueous ammonia containing thiophenols, and separating the layers.

5. The process of claim 4 in which an aliphatic solvent is used.

6. The process of claim 4 in which the solvent is selected from the group consisting of aliphatic ethers and aliphatic and hydroaromatic ketones having from 4 to 10 carbon atoms per molecule.

7. The process of claim 4 in which the solvent is cyclohexanol.

8. In the process of separating thiophenols from an alkyl phenol mixture containing same, the steps comprising extracting said mixture in an extraction zone with an aqueous ammonia having a concentration not less than about 10% in an amount substantially in excess of that which is equivalent to the content of thiophenols in said mixture, under conditions to produce two layers only, an alkyl phenol layer and a layer of aqueous ammonia containing thiophenols, separating the layers, distilling the ammonia layer under conditions to vaporize substantially all the ammonia and water and a portion of the thiophenols while refluxing with a solvent for thiophenols which is neutral and substantially chemically inert to ammonia to condense the thiophenol vapors and a portion of the water vapors, withdrawing the resulting condensate, separately condensing the ammonia and remaining water vapors, and returning condensed aqueous ammonia to the extraction zone.

9. The process of claim 8 in which the solvent for thiophenols is substantially immiscible with water and boils above 50° C. and below the thiophenols.

10. In the process of separating thiophenols from an alkyl phenol mixture containing same, the steps comprising flowing aqueous ammonia having a concentration not less than about 10% in an amount 5 to 200 times that which is equivalent to the thiophenol content of said mixture through an extraction zone in countercurrent to a volume of a neutral organic solvent for alkyl phenols amounting to not more than 10 times the volume of said mixture, which solvent is substantially chemically inert towards ammonia, substantially immiscible with water under the conditions of the extraction and has a boiling temperature below that of the alkyl phenols, withdrawing the aqueous ammonia and the solvent at opposite ends from the extraction zone, introducing said alkyl phenol mixture into said zone at a point intermediate between said ends, whereby the alkyl phenols are dissolved in said solvent to form a solution containing a small amount of ammonia, and the thiophenols are dissolved in the aqueous ammonia, distilling the alkyl phenol solution to separate the solvent and ammonia from the alkyl phenols, returning the solvent and ammonia to the extraction zone, separately distilling the aqueous ammonia under conditions to vaporize substantially all the ammonia and water and a portion of the thiophenols while refluxing with a solvent for thiophenols which is neutral and substantially chemically inert to ammonia to condense the thiophenol vapors and a portion of the water vapors, withdrawing the resulting condensate, separately condensing the ammonia and remaining water vapors, and returning condensed ammonia to the extraction zone.

DANIEL B. LUTEN, JR.
SAMUEL BENSON THOMAS.